US007032185B1

(12) United States Patent
Yohanan

(10) Patent No.: US 7,032,185 B1
(45) Date of Patent: Apr. 18, 2006

(54) GRAPHICAL METHOD AND SYSTEM FOR ACCESSING INFORMATION ON A COMMUNICATIONS NETWORK

(75) Inventor: Steven J. Yohanan, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/557,149

(22) Filed: Apr. 25, 2000

Related U.S. Application Data

(63) Continuation of application No. 09/201,815, filed on Dec. 1, 1998, now Pat. No. 6,072,491, which is a continuation of application No. 09/026,775, filed on Feb. 20, 1998, now Pat. No. 5,877,767, which is a continuation of application No. 08/580,742, filed on Dec. 29, 1995, now Pat. No. 5,737,560.

(51) Int. Cl.
*G06F 15/00* (2006.01)

(52) U.S. Cl. ...................................... 715/847; 715/749

(58) Field of Classification Search ............... 345/349, 345/340, 356–357, 335, 13, 11, 847, 749, 345/760; 715/847, 846, 805, 804, 802, 748, 715/749, 760

See application file for complete search history.

(56) References Cited

U.S. PATENT DOCUMENTS

| 5,021,976 | A | | 6/1991 | Wexelblat et al. ........... 345/356 |
|---|---|---|---|---|
| 5,295,244 | A | | 3/1994 | Dev et al. ................... 345/357 |
| 5,694,546 | A | * | 12/1997 | Reisman ..................... 345/749 |
| 5,694,594 | A | * | 12/1997 | Chang ........................ 345/853 |
| 5,768,508 | A | | 6/1998 | Eikeland ................. 395/200.32 |
| 5,799,318 | A | * | 8/1998 | Cardinal et al. ............ 345/748 |
| 5,838,906 | A | * | 11/1998 | Doyle et al. ................ 345/748 |
| 5,877,767 | A | * | 3/1999 | Yohanan ..................... 345/357 |
| 5,907,704 | A | * | 5/1999 | Gudmundson et al. ..... 395/701 |
| 5,970,469 | A | * | 10/1999 | Scroggie et al. ............. 705/14 |
| 6,072,491 | A | * | 6/2000 | Yohanan ..................... 345/349 |
| 6,131,121 | A | * | 10/2000 | Mattaway et al. .......... 709/227 |

OTHER PUBLICATIONS

NSCA Mosaic Version History, "www.ncsa.uiuc.edu/Divisions/PublicAffairs/MosaicHistory/history.html" version .4 and version .5, 1993.*

Barnes, "10 Minute Guide to Windows 3.1, Quick Lessons for Success", SAMS, 1992.* http://www.wholymac.com/ , *Wholly Mac Software Home Page*, Sep., 1995, pp. 1-6.

(Continued)

*Primary Examiner*—Steven Sax
(74) *Attorney, Agent, or Firm*—Lee & Hayes PLLC

(57) ABSTRACT

A system and computer-based method for permitting a computer system to access a network location using a browser application by activating a desktop icon. The system comprises a first computer readable program code means for causing the computer system to display a desktop icon associated with a file containing a network address corresponding to the network location. When the desktop icon is activated, a second computer usable program code means causes the computer to launch an instance of a browser application or a new window for a currently executing browser application and a third computer usable program code means causes the computer system to pass the network address to the browser application, thereby accessing the network location.

14 Claims, 4 Drawing Sheets

OTHER PUBLICATIONS http://www.ffg.com/gnwin2.html, *Forefront: GraBet V2.0 for Windows 3.1,* Feb. 2, 1996, pp. 1-2.

http://www.atom.co.jp/VOYAGER/WebTools/WebPIN/WebPinMaker-E.html, *WebPinProject,* Jan. 29, 1996, pp. 1-3.

http://home.netscape.com/newsref/pr/newsrelease30.html, *Netscape Press Release,* Jan. 29, 1996, pp. 1-2.

Electronic Mail Message from whollymac@aol.com, Feb. 2, 1996, 1 page.

*Microsoft Windows® 95 Operating Manual* (excerpt), ©1981-1985 Microsoft Corporation, pp. 39 and 58.

Microsoft Windows® Press Release, *PR Newsire,* Aug. 24, 1995, 3 pages.

Spitz, R. J. et al., "Paladina Marketing Corporation-Company report", William Blair & Company; ILL. May 15, 1996.

Painter, L., "Microsoft Corporation-Company Report", Merrill Lynch capital Markets, NY, Mar. 12, 1996.

Kiggon, J. et al., "History and Dynamics of Internet-Industry Report", Prudential Securities, Inc., NY, Dec. 8, 1995.

Girishanakar, S., "Microsoft Struts Its Internet Stuff", *Communications Week,* 1995, No. 553, p. 1.

Gaffin, A., "Take a Walk on the Website", *Network World,* may 1995, p. 57.

Karpinski, R., "New browser application—GrabNet lets users cut and paste", *interactive Age,* 1995, No. 216, p. 17.

"Microsoft more than just browsing", *Communicationsweek International,* 1995, No. 143, p. 9.

Microsoft Corporation, "Microsoft Windows at Deadline", Redmond, Washington, Feb. 15, 1994, 4 pages.

Microsoft Corporation, "Microsoft Ships Beta Release of Internet Explorer Version 2.0", Redmond, Washington, Sep. 28, 1995, 4 pages.

Microsoft Corporation, "Microsoft Introduces Internet Explorer", Redmond, Washington, Aug. 17, 1995, 4 pages.

\* cited by examiner

GRAPHICAL METHOD AND SYSTEM FOR ACCESSING INFORMATION ON A COMMUNICATIONS NETWORK

RELATED APPLICATIONS

This application is a continuation of U.S. patent application Ser. No. 09/201,815, filed Dec. 1, 1998 now U.S. Pat. No. 6,072,941, which is a continuation of U.S. application Ser. No. 09/026,775, filed Feb. 20, 1998 (now U.S. Pat. No. 5,877,767), which is a continuation of U.S. application Ser. No. 08/580,742, filed Dec. 29, 1995 (now U.S. Pat. No. 5,737,560).

BACKGROUND OF THE INVENTION

1. Field of the Invention

The field of the invention relates generally to accessing information on a network, and more particularly, to a system and computer-based method for providing easy access to sites on the World Wide Web.

2. Related Art

A vast array of electronic information infrastructures are rapidly being assembled and used by individuals, organizations, businesses and industry to facilitate the exchange of information and data across both near and far distances. As available computing power at a given price point is increasing, personal computers, workstations and other computing devices are finding their way onto more desktops, into more offices, and into more working environments than ever before imagined. These computing devices are used as the links into the information infrastructure, allowing all forms of electronic communications and data exchange.

This rise of electronic communication is a world-wide phenomenon, globally affecting personal lives as well as all facets of business and industry. Be it a local area network linking a few computers together in close proximity, or a wide area network providing information exchange around the globe, more and more businesses and individuals are turning to communications and data exchange via this electronic infrastructure. The electronic information infrastructure is reaching business operations from manufacturing and production to research and development, sales and commerce.

This electronic information infrastructure has become a common source of news, information and entertainment for computer end-users. In this regard, consider the Internet, for example. The Internet is a world-wide set of interconnected computer networks that can be used to access a plethora of information in various forms.

Computer end-users employ network addresses to locate information on the electronic information infrastructure. For example, on the Internet, Uniform Resource Locators (URLs) are used to specify sites such as servers within the World Wide Web (WWW; or the "web"). The web is a distributed hypermedia system and functions as a client-server based, information presentation system.

Files on the web are also referred to as "pages," and are written in HyperText Mark-up Language (HTML). Web pages include hyperlinks to other files. Web pages are typically viewed using an application program called a web browser (also known as an "internet browser" or "browser"), such as Netscape Communications Corporation's (Mountain View, Calif.) NetScape™ browser.

Conventionally, in order to access a network location, an end user must first open a browser application and then enter the URL of a desired network location. The browser connects to the web via a modem or other conventional network interface, thus permitting the user to read and interface with the accessed network location.

The following are example URL formats:

file://wuarchive.wustl.edu/mirrors/msdos/graphics/gif-kit.zip ftp://wuarchive.wustl.edu/mirrors http://www.w3.org:80/default.html news:alt.hypertext telnet://dra.com The first part of the URL, before the colon, specifies the access method. The part of the URL after the colon is interpreted in accordance with the access method specified (for example, ftp is file transfer protocol and is command line-based). In general, two slashes after the colon indicate a machine name (machine:port is also valid).

Having to first access a web browser and then type-in a network location's URL can be tedious. Some browsers permit the user to store frequently accessed network locations to facilitate accesses. This is accomplished through the use of what is sometimes referred to as a bookmark. Through the use of a bookmark, once a browser is opened, the user may be able to quickly access a favorite site by selecting a bookmark previously designated to mark the location of that site.

Increased accesses by individual users on a day-to-day basis demands a more efficient method for accessing network locations.

What is needed is a convenient method to access network locations without having to open a browser and key-in the desired site's URL.

SUMMARY OF THE INVENTION

The present invention is directed to a system and computer-based method providing users quick access to a network location without having to first launch a web browser or key-in the site's URL. The system comprises a first computer readable program code means for causing the computer system to display a desktop icon, called a "jumpsite," which is associated with a file containing a network address corresponding to the network location. When the jumpsite is activated, a second computer usable program code means causes the computer to launch an instance of a browser application or a new window for a currently executing browser application, and a third computer usable program code means causes the computer system to pass the network address to the browser application, thereby accessing the network location.

According to a preferred embodiment of the present invention, jumpsites represent specific Internet network locations, addressed by their URLs. Each jumpsite is a hyperlink to a designated network location that the user frequently explores. Each jumpsite can be graphically manipulated to access its associated network location. These addresses are also referred to as http (or hypertext-transfer protocol) addresses.

One feature of the present invention is that it permits a user to access a desired network location without having to first access a browser application.

Another feature of the present invention is that it permits a user to store network locations in a hierarchical, browser-independent manner.

BRIEF DESCRIPTION OF THE FIGURES

The present invention will be described with reference to the accompanying drawings, wherein.

Figure 1:
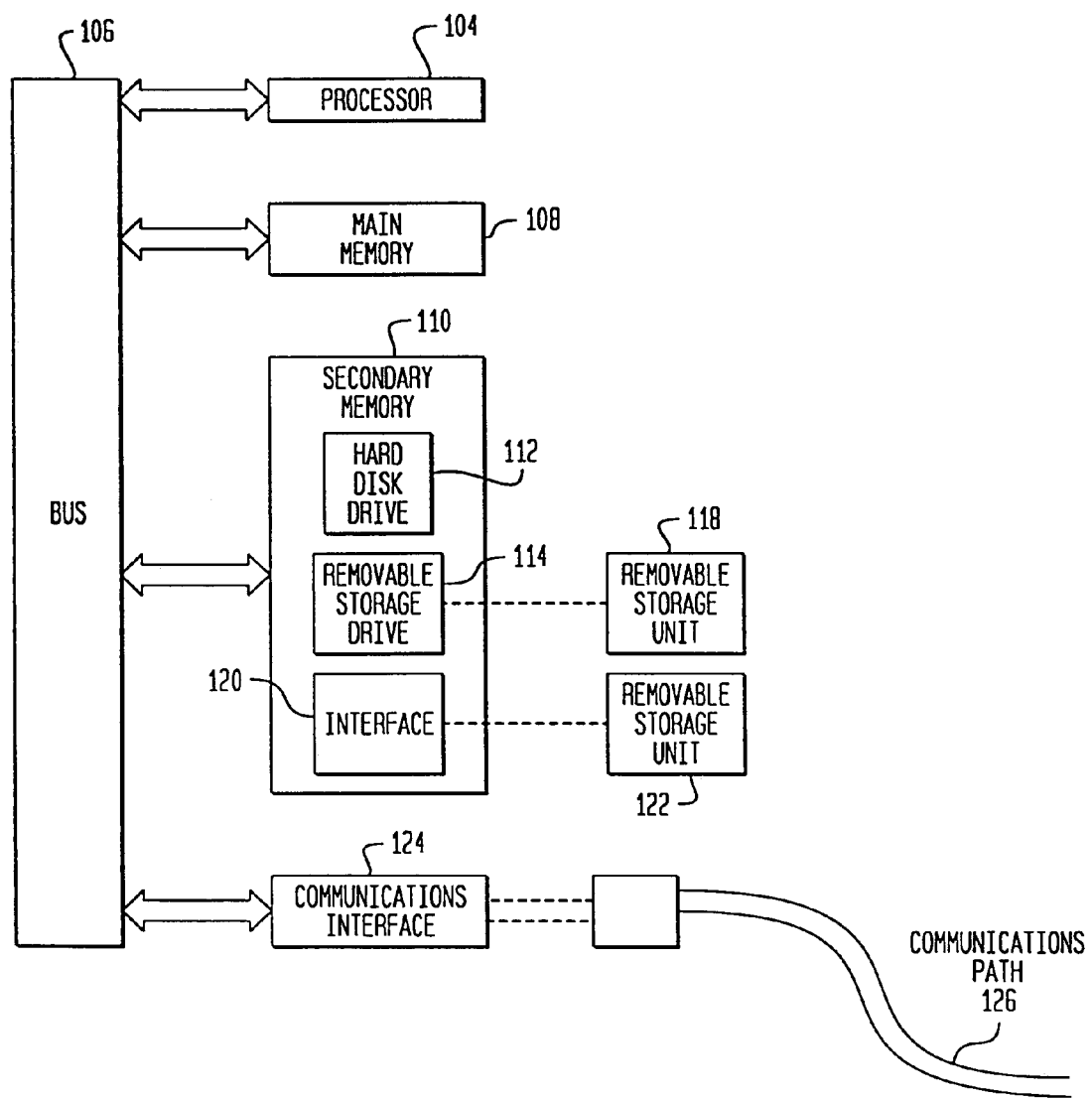
FIG. 1 is a block diagram illustrating an example environment in which the present invention can operate.

The preferred embodiment of the invention is described below with reference to these figures where like reference numbers indicate identical or functionally similar elements. Also in the figures, the left most digit of each reference number corresponds to the figure in which the reference number is first used.

DETAILED DESCRIPTION OF THE PREFERRED EMBODIMENTS

1. Introduction and Overview of the Invention

The present invention is directed toward a system and method for allowing a user to access a desired network location without having to first access a browser application. According to the invention, a Graphical User Interface (GUI) icon is provided that allows the user to "jump" directly to the designated network location. When the user selects the icon (e.g., by double-clicking on the icon), a browser application is automatically opened and the designated network location is accessed.

A user may create more than one icon and each icon can be used to designate a different network location. Thus, a user can have a different icon for each of his or her favorite or most frequently visited sites. In one embodiment of the present invention, the icons may have different visual representations. The icons can be stored on the user's desktop, in folders, or, in fact, wherever the GUI allows icons to be kept.

2. Icon

An icon refers to an object displayed by an output monitor on the "desktop" (i.e., workspace) of a computer system employing a GUI; the object is associated with a computer file available to the computer's operating system. Standard file operations can each be invoked with respect to the associated file by performing a corresponding graphical manipulation of the icon. For example, a request to execute the program contained in a file might be invoked by double-clicking on the associated desktop icon. Similarly, a request to delete a file might be invoked by graphically moving or "dragging" the associated desktop icon onto the displayed image of a trash can or dumpster; or by cursor-clicking on the associated desktop icon (to "select" that icon) and then cursor-clicking on a pull-down menu command labeled "delete." In response to such actions, the operating system of the local computer system performs the requested operation.

A principal advantage of GUIs employing desktop icons of this nature is that the procedures corresponding to standard file operations are generic for all relevant desktop icons within a particular computer system. In other words, the actions that invoke file operations are independent of the identity of the particular icon and file being operated upon. Consequently, a user need learn only one basic set of relatively intuitive actions to perform standard file operations on the files represented by icons within the user's computer system.

Note that the set of standard file operations and the corresponding icon manipulations vary among different computer platforms and operating systems. The use of icons and standard file operations by clicking and dragging icons is well known and is commonly employed by several well known GUIs, platforms and operating systems such as Windows, Apple, and Unix.

3. Environment of the Invention

Before describing the invention in detail, it is useful to first describe an example environment in which the invention can operate. FIG. 1 is a block diagram illustrating an example environment in which the present invention can operate. The environment is a computer system 100 that includes one or more processors, such as processor 104. The processor 104 is connected to a communications bus 106. Various software embodiments are described in terms of this example computer system. After reading this description, it will be apparent to a person skilled in the relevant art how to implement the invention using other computer systems and/or computer architectures.

Computer system 100 also includes a main memory 108, preferably random access memory (RAM), and can also include a secondary memory 110. The secondary memory 110 can include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118 represents a floppy disk, magnetic tape, optical disk, etc., which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 100. Such means can include, for example, a removable storage unit 122 and an interface 120. Examples can include a program cartridge and cartridge interface (such as that found in video game devices), a removable memory chip (such as an EPROM, or PROM) and associated socket, and other removable storage units 122 and interfaces 120 which allow software and data to be transferred from the removable storage unit 122 to computer system 100.

Computer system 100 can also include a communications interface 124. Communications interface 124 allows software and data to be transferred between computer system 100 and external devices via communications path 126. Examples of communications interface 124 can include a modem, a network interface (such as an ethernet card), a communications port, etc. Software and data transferred via communications interface 124 are in the form of signals which can be electronic, electromagnetic, optical or other signals capable of being received by communications interface 124 via communications path 126. Note that communications interface 124 provides a means by which computer system 100 can interface to a network such as the Internet.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

4. Software and Hardware Embodiments

The present invention is preferably implemented using software running (that is, executing) in an environment similar to that described above with respect to FIG. 1. In this document, the term "computer program product" is used to generally refer to removable storage device 118 or a hard disk installed in hard disk drive 112. These computer program products are means for providing software to computer system 100.

Computer programs (also called computer control logic) are stored in main memory and/or secondary memory 110. Computer programs can also be received via communications interface 124. Such computer programs, when executed, enable the computer system 100 to perform the features of the present invention as discussed herein. In particular, the computer programs, when executed, enable the processor 104 to perform the features of the present invention. Accordingly, such computer programs represent controllers of the computer system 100.

In an embodiment where the invention is implemented using software, the software may be stored in a computer program product and loaded into computer system 100 using removable storage drive 114, hard drive 112 or communications interface 124. Alternatively, the computer program product may be downloaded to computer system 100 over communications path 126. The control logic (software), when executed by the processor 104, causes the processor 104 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

5. WebJumper and Jumpsites

Having thus described an example environment in which the invention can be implemented, a preferred embodiment of the invention is now described. In a preferred embodiment, a desktop icon on a local computer represents a web page (e.g., a file) on a web site (e.g., a remote server) that is accessed by an http request from a local web browser. As will be apparent to one skilled in the relevant art, a jumpsite can be employed to access other types of files and network locations by other access methods without departing from the spirit and scope of the present invention. As stated above, according to the invention icons are provided which allow the user to access a designated web site, without having to first open a browser application and then access the location.

In one embodiment, the present invention is directed to a computer-based system and method for creating the jumpsites. This system and method are referred to in this document as "WebJumper." WebJumper is a tool that lets users create desktop icons that "jump" the user to designated web sites; these icons are called "jumpsites." The WebJumper-tool provides a GUI to "capture" information from the user regarding a designated web site. That is, the GUI permits the user to enter information regarding the designated web site; this information is then stored in a file associated with the icon.

Jumpsites can be placed on the desktop, in a directory, or in an icon catalog page for easy access. Further, jumpsites may be used with any standard browser. Thus, jumpsites provide a browser-independent way for users to organize and access network locations.

Figure 2:
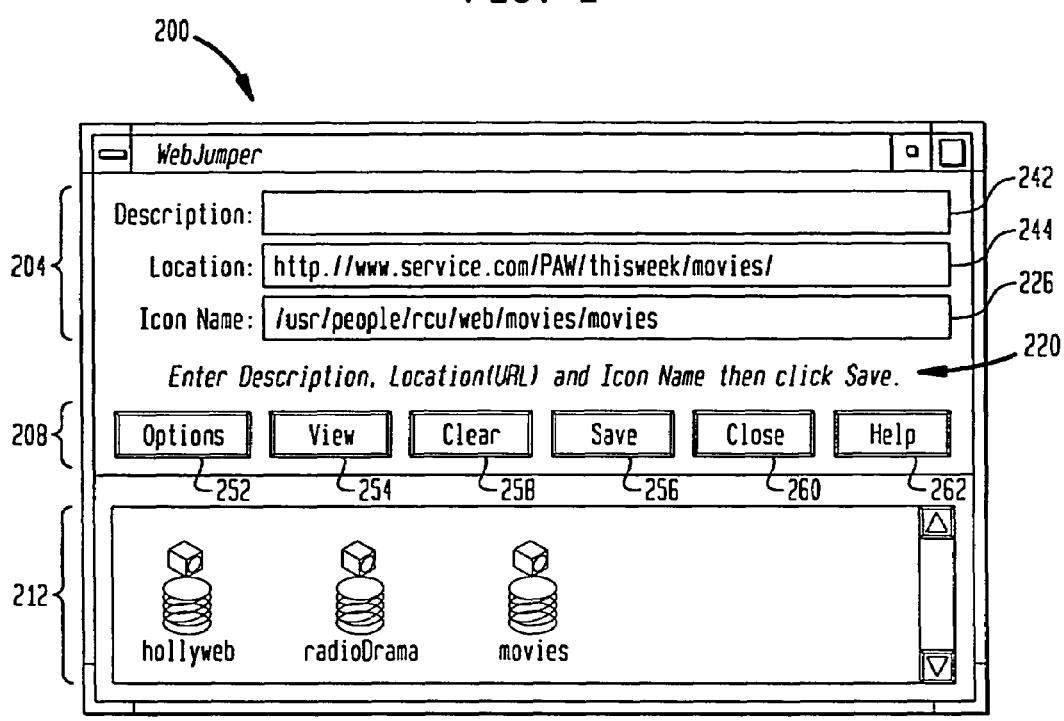
FIG. 2 is a diagram illustrating an example window 200 that serves as the GUI for the WebJumper tool.

FIG. 2 is a diagram illustrating an example window 200 that serves as the GUI for the WebJumper tool. Referring now to FIG. 2, the WebJumper tool comprises a main window section 204, a button bar section 208 and an icon display section 212. Main window section 204 provides a section for the user to enter information pertaining to the jumpsite being created. Button section 208 provides a series of "buttons" that can be activated by the user to select certain features. Display section 212 provides a section where created jumpsites can be displayed to the user.

Main window section 204 provides data entry locations permitting the user to specify a description for a new jumpsite icon, the network address (e.g., URL) of the web site to be associated with the new jumpsite icon, and the icon name.

The description field 242 allows the user to enter a description of the jumpsite being created. This description can be any moniker which describes the jumpsite to the user. This field is optional.

Location field 244 allows the user to enter the URL of the web site designated by the jumpsite being created. According to one embodiment, location field 244 ignores any new line and space characters. This means that users can cut and paste a URL containing new line and space characters into location field 244 without needing to edit the text.

Icon name field 246 provides an entry for the user to enter a name for the jumpsite being created. This name is the name under which the jumpsite is to be stored. In a preferred embodiment, the directory as to where the jumpsite is to be kept is included in icon name field 246. For the example illustrated in FIG. 2, the jumpsite is to be named "movies" and is to be kept in a directory "/usr/people/rcu/web/movies" on the system.

Buttons 208 permit the user to perform tasks in connection with creating jumpsite icons. An "Options" button 252, permits the user to set several preferences. Clicking the Options button 252 activates an options window. In the options window (not shown), the user can enter certain settings or attributes for the jumpsite being created, or can change certain settings or attributes for an existing jumpsite. For example, the options settings can allow the user to identify or select a default web site or the default web browser. For example, the user can select the NetScape Navigator™ browser or the Mosaic browser.

In one embodiment of the present invention, the options window can also permit the user to change or select a default directory for storing jumpsite icons and their corresponding information. One manner by which this can be accomplished is by allowing the user to type a directory path in a field designated Default Icon Location Label (not shown). Once the Default Icon Location is selected, all jumpsite icons created will be saved in the selected default directory unless the user specifies otherwise. If the user wishes a jumpsite to be stored in another directory, the user can specify the directory by, for example, including the directory name in the icon name when creating the jumpsite. In this embodiment, the default directory automatically appears in location field 244 when a new jumpsite is being created. This default directory acts as a "hot list" of the user's favorite web sites.

All jumpsites maintained in this hot list are visible to the user when the default directory is selected.

A "View" button 254 allows the user to view icon directories. Activating View button 254 enlarges display section 212 permitting the user to see all jumpsite icons stored in any directory specified by the user. This directory view permits the user to remove, rename, copy, organize into folders, and otherwise manipulate the jumpsite icons that they create or copy into their jumpsite directory.

A "Save" button 256, when activated, causes information regarding a jumpsite icon that is specified in the main window section 204 to be saved. Thus, once a user has entered a description, location and name for the new jumpsite, the user activates Save button 256 to save this information and create the new jumpsite or modify a previously stored jumpsite.

In one embodiment, where a user wishes to edit a jumpsite, the user can select the jumpsite to be edited from display section 212 (e.g., by single-clicking it with a pointing device). This selection causes the information about that jumpsite to be visible in main window section 204 where it can be edited by the user. Changing the name causes the jumpsite to be copied, while changing the other fields causes the jumpsite to be edited.

A "Clear" button 258 can be used by the user to clear the information in the description field 242, location field 244 and icon name field 246.

A "Close" button 260 is provided for the user to easily close the WebJumper tool. Of course, as is the case with other windowing environments, the tool can be closed by double-clicking on the "dash" in the upper left hand corner of WebJumper window 200.

A "Help" button 262 is included to provide on-line information concerning the operation, use and features of the WebJumper tool.

WebJumper window 200 also includes a feedback line 220 to prompt the user for input or otherwise guide the user when using the WebJumper tool. The feedback line blanks when the user depresses the Clear, Save or Options button.

Multiple jumpsite icons can be created in a single session by entering information for a first icon in WebJumper window 200, saving it using Save button 256, using Clear button 258 to clear fields 242, 244 and 246, and then repeating the steps described above for creating and saving the first jumpsite icon.

Note that the user can also categorize jumpsite icons by creating directories or icon catalog pages for different topics. By creating jumpsites by using the WebJumper tool, the user can drag related icons from the default directory, another directory, or from the WebJumper tool itself into other directories or icon catalog pages. Also, the icons can be stored right on the user's desktop allowing immediate access without having to open directories or other windows.

Jumpsite icons created with the WebJumper tool of the present invention are transportable. Jumpsite icons can be copied by disk, attached to e-mail messages and otherwise transported to another system. In this manner, jumpsite icons attach to e-mail messages in a similar manner that document files, or the like, are attached to conventional Internet messages. If recipients have WebJumper installed on their computer, they can drag an icon out of the message onto the desktop and double-click on it to open the jumpsite. If the recipient of the message does not have WebJumper installed, a text file appears when they double-click the icon. This file contains the URL information for the web site associated with the jumpsite icon, but does not contain the web page itself.

When a user double clicks on a jumpsite icon the designated web site is opened in a browser application. Another alternative technique for opening jumpsite icons is to drag them onto the icon representing the browser application. Multiple web sites can be open at the same time. According to one embodiment, each time a jumpsite icon is double-clicked, a new instance of browser 510 is opened and the web site accessed. Therefore, multiple web sites can be open simultaneously on the user's terminal.

Existing jumpsite icons can be edited easily using the View button 254 in WebJumper window 200. As noted above, all of the jumpsite icons will be displayed in the directory view window which appears at the bottom of the WebJumper window 200. Alternatively, the user can use commands available in a menu which appears when a jumpsite icon is selected (e.g., by single-clicking on the icon).

6. Creating Jumpsites

One embodiment of the invention is directed toward creating jumpsites. To create a jumpsite, the user utilizes the WebJumper tool. Creation of a jumpsite is described in terms of a WebJumper tool using the example WebJumper window 200 described above. After reading this description, it will become apparent how jumpsites can be created by the WebJumper tool using alternative window configurations. As would be apparent to a person skilled in the relevant art, jumpsites can be created by other methods without departing from the spirit and scope of the present invention.

Figure 3:
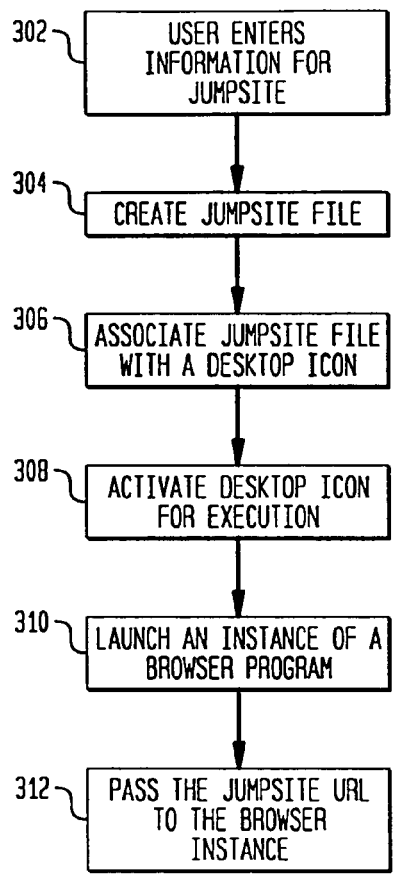
FIG. 3 is a flow diagram illustrating the process followed in creating a jumpsite according to one embodiment of the invention.

FIG. 3 is a flow diagram illustrating the process followed in creating a jumpsite according to one embodiment of the invention. Referring now to FIG. 3, in a step 302 the user enters desired information into WebJumper window 200. This information includes, at a minimum, the URL for the site to be accessed when jumpsite is selected.

Figure 4:
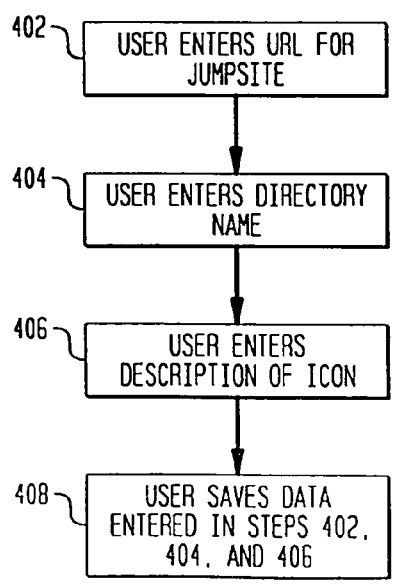
FIG. 4 is a flow chart illustrating in further detail the step 304 of user entry of information for the creation of the jumpsite.

FIG. 4 is a flow chart illustrating in further detail the step 304 of user entry of information for the creation of the jumpsite. Referring now to FIG. 4, in a step 402, the user enters the URL for the site he or she desires to access by the jumpsite being created. For example, if the user wishes to create an icon for the Silicon Surf home page of Silicon Graphics, Inc., the user would enter: http://www.sgi.com. Using the example window 200 described above, this information is entered into location field 244.

Preferably, in a step 404, the user also enters name and directory information for the jumpsite being created. Again, using the example WebJumper window 204, the user types a name for the icon in name field 246 of the WebJumper window 200. Preferably, the name includes directory information where the jumpsite is to be stored. In one embodiment, there is a default directory so the user does not have to enter directory information each time. Following the above example, the user can type silicon.surf as the name of the file for the Silicon Surf home page.

In a step 406, the user can add a description of the icon as well. This description can provide the user with a brief description identifying the jumpsite to a greater level of specificity. In the example WebJumper window 200, the description is entered in description field 242.

In one embodiment, to enter a description the user clicks on options button 252 to display a WebJumper options window (not shown). The WebJumper options window includes an additional button called "Show Description Field" (also not shown). An "OK" button is also provided to exit the WebJumper options window. When either button is activated, a description field then appears in the main WebJumper window, as described above. At this point, the user can type in the description of the jumpsite icon. Depending on the configuration of the tool, the description field can be set up to always appear when window 200 is opened, or to appear only when specifically requested via the options window.

In a step 408, once all of the desired information about the jumpsite is entered into WebJumper window 200, the user can click Save button 256 and the WebJumper tool creates the icon and saves it in the directory specified. Prompts can be included for specifying a different directory in which to save the new jumpsite icon.

Figure 5:
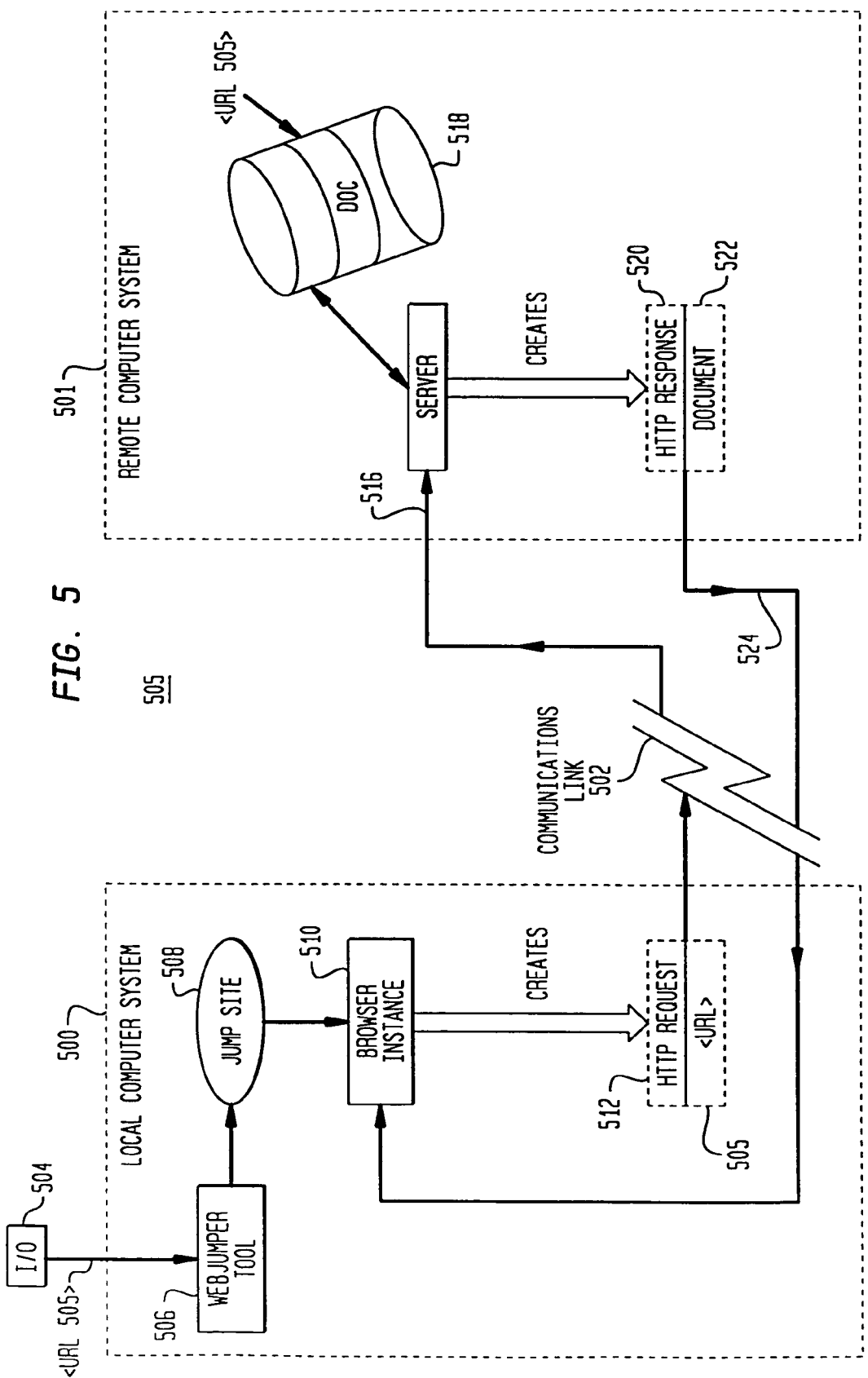
FIG. 5 is a block diagram illustrating a local computer system 500 (such as computer system 100, for example) and a remote computer system 501 connected by a communication link 502.

FIG. 5 is a block diagram illustrating a local computer system 500 (such as computer system 100, for example) and a remote computer system 501 connected by a communications link 502. The information entered by the user in step 302 is represented in FIG. 5 by block 504 labeled input/output (I/O) in FIG. 5.

Once the user saves a new jumpsite icon or modifies and saves an existing jumpsite icon, the WebJumper tool, shown at 506, creates a jumpsite 508 and saves it as a file on the local computer system 500. This step of creating the jumpsite 508 and saving it is shown at 304 in FIG. 3. In one embodiment, step 304 is transparent to the user.

Specifically, the WebJumper tool creates a file that executes when the jumpsite icon is selected for execution by the user. A file is created that, when executed, launches a browser instance 510, thereby creating an http request 512.

According to one embodiment of the present invention, the jumpsite file stores the URL but does not contain executable browser code. Rather, the jumpsite file contains only linkage information that, when executed, will cause an operating system of the local computer system 500 to launch browser instance 510 using the stored URL that was specified by the user in the jumpsite icon.

The WebJumper tool forms an association between the newly created jumpsite file and a new desktop icon to represent the information associated with that jumpsite file. The new desktop icon is called a jumpsite icon as discussed above. This association step is shown at 306 on FIG. 3.

Once a jumpsite icon has been created by the WebJumper tool, it can be moved directly onto the user's desktop by clicking and dragging the icon using a pointing device. The contents of the jumpsite file are not affected by this operation. After jumpsite icons have been created and positioned on the user's desktop, the WebJumper tool can be closed.

7. Using Jumpsites

At any time after a jumpsite icon is created, the user can readily access the web site specified by a given jumpsite icon by simply double-clicking on that jumpsite icon. By positioning one or more jumpsite icons on the user's desktop, the user has direct access to the associated web sites without having to access the WebJumper tool or take the extra step of launching a browser. When the user activates (e.g., double-clicks on) a jumpsite icon, as shown in a step 308 in FIG. 3 an instance of the selected browser is launched, as shown in a step 310, and the jumpsite's URL is passed to the browser instance, as shown in a step 312. The browser then automatically returns the designated web page in an new active browser window on the user's desktop.

In an alternative embodiment, activating the jumpsite icon returns the designated web page in an already-open widow of a currently executing browser application.

Referring again to FIG. 5, once the user double-clicks on a jumpsite icon 508, an instance 510 of the associated browser is executed. The jumpsite file passes the URL 505 to browser instance 510, which generates an http request 512 using URL 505. The http request 512 is transferred over the communications network 502, as shown generally at 514. The generation, transfer and servicing of http requests are performed in a conventional manner, as would be apparent to one skilled in the relevant art.

For example, the http request 514 is received at the remote computer system 501 by a server 516. The server 516 parses the http request, and in response accesses the file specified with the URL 505. For example, the file can be accessed from a database 518. The server 516 then creates an http response 520, attaches a copy of the file 522 to the http response 520 and sends the response and file copy back to the requesting browser instance 510 via communications network 502, as shown generally at 524. At the local computer system 500, browser instance 510 parses the response 524 and ultimately displays the file as a document on the user's display within a window created by browser instance 510.

8. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A graphical interactive method for permitting a computer system to access a web site, the method comprising the steps of:

displaying a desktop icon on a desktop, said desktop icon associated with an address of the web site;

if a web browser application is not currently executing, launching a web browser application in response to a user of said computer system selecting said desktop icon for execution, and accessing the web site using said web browser application and said address of the web site; or if a web browser application is currently executing, in response to a user of said computer system selecting said desktop icon for execution, accessing the web site using said currently executing web browser application and said address of the web site.

2. A graphical interactive method for permitting a computer system to access a web site, said method comprising the steps of:

displaying a desktop icon on a desktop, said desktop icon associated with a file containing information relating to the web site;

accessing the web site using an already executing web browser application and said address for the web, in response to a user of said computer system selecting said desktop icon for execution, wherein said web browser application is separate from said file.

3. A graphical interactive computer system for accessing a desired document located at a network location, comprising:

means for displaying a desktop icon on a desktop, said desktop icon associated with a file containing a network address corresponding to the network location;

means for enabling a user of the computer system to interactively select said desktop icon for execution;

means for launching a web browser application in response to the user selecting said desktop icon for execution, if said web browser application is not currently executing, wherein said application is separate from said file; and means for retrieving the desired document from the network location using said web browser application and said network address.

4. A graphical interactive method for permitting a first computer system to access a web site, said method comprising the steps of:

receiving a desktop icon associated with a file from a second computer system, said file containing an address corresponding to web site;

displaying the desktop icon on a desktop of the first computer system;

launching a web browser application in response to a user of the first computer system selecting said desktop icon for execution; and accessing the web site using said web browser application and said address corresponding to the web site.

5. The method of claim 4, wherein said receiving step comprises receiving an e-mail from the second computer system, said e-mail including said desktop icon.

6. The method of claim 4, wherein said receiving step comprises receiving an internet message from the second computer system, said internet message including said desktop icon.

7. One or more computer-readable media having computer-readable instructions thereon which, when executed by a programmable device, if a web browser application is not currently executing, launch the web browser application in response to a user of the programmable device selecting a desktop icon on a desktop for execution, the desktop icon associated with an address of a web site accessible by the web browser application or, if a web browser application is currently executing, use the currently executing web browser application for accessing the web site in response to a user of the programmable device selecting the desktop icon.

8. A desktop icon for display on a desktop, said desktop icon associated with a web site wherein selection of the desktop icon launches a web browser application, if the web browser application is not currently executing, and causes the web browser application to access the web site or, if a web browser application is currently executing, causes the currently executing web browser application to access the web site.

9. One or more computer-readable media having computer-readable instructions thereon which, when executed by a programmable device in response to selection of a desktop icon displayed on a desktop, the desktop icon associated an address of a web site, if a web browser application is not currently executing, launch a web browser application, the web browser application capable of accessing the web site using the address or, if a web browser application is currently executing and capable of accessing the web site using the address, use the currently executing web browser application for accessing the web site using the address.

10. A graphical interactive system comprising:

means for displaying a desktop icon on a desktop, said desktop icon associated with an address of a web site;

means for launching a web browser application, if said web browser application is not currently executing, in response to a user of said system selecting said desktop icon for execution;

means for accessing the web site using said web browser application and said address of the web site; and means for accessing the web site, if a web browser application is currently executing, using the currently executing web browser application and said address of the web site in response to a user of said computer system selecting said desktop icon for execution.

11. A graphical interactive method for permitting a computer system to access a web site, the method comprising the steps of:

displaying a desktop icon on a desktop, said desktop icon associated with an address of the web site; and in response to a user of said computer system selecting said desktop icon for execution, deciding if a web browser application is already executing and, if so, accessing the web site using the already executing web browser application and said address of the web site.

12. One or more computer-readable media having computer-readable instructions thereon which, when executed by a programmable device, decide if a web browser application is already executing and, if so, use the already executing web browser application to access a website in response to a user of the programmable device selecting a desktop icon on a desktop for execution, the desktop icon associated with the address of the web site accessible by the web browser application.

13. A desktop icon for display on a desktop of a computer, said desktop icon associated with a web sites wherein selection of the desktop icon causes the computer to decide if a web browser application is already executing and, if the web browser application is already executing, the selection causing the computer to use the already executing web browser application and to cause the web browser application to access the web site.

14. A graphical interactive system comprising:

means for displaying a desktop icon on a desktop, said desktop icon associated with an address of a web site;

means for deciding whether a web browser application is already executing in response to a user of said system selecting said desktop icon for execution; and means for accessing the web site using said already executing web browser application and said address of the web site.

* * * * *